(12) United States Patent
Han (10) Patent No.: US 8,986,149 B2
(45) Date of Patent: Mar. 24, 2015

(54) INFINITELY VARIABLE DIRECTION CONTROL

(71) Applicant: Kyung Soo Han, Timonium, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 0 days.

(21) Appl. No.: 14/155,401

(22) Filed: Jan. 15, 2014

(65) Prior Publication Data

US 2014/0141927 A1  May 22, 2014

Related U.S. Application Data

(60) Division of application No. 13/915,785, filed on Jun. 12, 2013, now Pat. No. 8,702,552, which is a division of application No. 13/568,288, filed on Aug. 7, 2012, now Pat. No. 8,485,933, application No. 14/155,401, which is a division of application No. 13/425,501, filed on Mar. 21, 2012, now Pat. No. 8,641,570, said application No. 13/568,288 is a continuation-in-part of application No. 13/384,621, filed as application No. PCT/US2010/042519 on Jul. 20, 2010, now Pat. No. 8,388,481.

(60) Provisional application No. 61/521,408, filed on Aug. 9, 2011, provisional application No. 61/523,846, filed on Aug. 16, 2011.

(51) Int. Cl.
| | |
|---|---|
| *F16H 3/52* | (2006.01) |
| *F03B 15/02* | (2006.01) |
| *F16H 15/50* | (2006.01) |
| *F03B 3/18* | (2006.01) |
| *F03B 15/08* | (2006.01) |
| *F03D 11/02* | (2006.01) |
| *F16H 3/56* | (2006.01) |
| *F16H 29/04* | (2006.01) |
| *F16H 3/62* | (2006.01) |

(52) U.S. Cl.
CPC .......... *F03B 15/02* (2013.01); *Y10T 74/18792* (2015.01); *Y10T 74/18296* (2015.01); *F16H 15/50* (2013.01); *F16H 3/52* (2013.01); *F03B 3/18* (2013.01); *F03B 15/08* (2013.01); *F05B 2260/402* (2013.01); *F03D 11/02* (2013.01); *Y02E 10/223* (2013.01); *Y02E 10/722* (2013.01); *Y02E 10/226* (2013.01); *F16H 3/56* (2013.01); *F16H 29/04* (2013.01); *F16H 3/62* (2013.01)
USPC ...................................................... 475/206

(58) Field of Classification Search
CPC ........... F16H 3/52; F16H 29/04; F16H 15/50; F16H 48/11; F16H 48/22
USPC ......................................... 475/206, 224, 249
See application file for complete search history.

(56) References Cited

U.S. PATENT DOCUMENTS

| | | | |
|---|---|---|---|
| 2,961,889 A * | 11/1960 | Granryd | ........................ 477/36 |
| 5,016,493 A | 5/1991 | Han | |

(Continued)

*Primary Examiner* — Tisha Lewis
(74) *Attorney, Agent, or Firm* — Cameron LLP (57) ABSTRACT

Infinitely variable motion control (IVMC) provides motion control without any requirement for changing gears or use of a clutch. A spur gear transgear, defined as a system having an input, an output and a control, a variable pitch cam having an eccentric inner and outer cam assembly and a driver may be used to form a speed converter. The speed converter is used in various forms to provide an infinitely variable transmission, a differential, embodiments of wind and river turbines and pumps/compressors. In one embodiment, the speed converter drives a direction control assembly (forward, reverse and neutral) and first and second directional control assemblies to provide a vehicle with zero turn radius. A variable torque converter may be used in various embodiments to control torque from a minimum to a maximum by controlling movement of a rotor along a shaft in relation to a stator.

15 Claims, 7 Drawing Sheets

IVT (SPEED CONVERTER AND DIRECTION CONTROL)

(56) References Cited

U.S. PATENT DOCUMENTS

| | | |
|---|---|---|
| 5,937,701 A | 8/1999 | Mimura |
| 6,068,570 A | 5/2000 | Han |
| 6,537,168 B1 | 3/2003 | Han |
| 6,641,327 B1 | 11/2003 | Lassila et al. |
| 7,462,124 B2 | 12/2008 | Han |
| 7,731,616 B2 | 6/2010 | Han |
| 7,731,619 B2 | 6/2010 | Han |
| 2007/0082779 A1* | 4/2007 | Han .............................. 475/325 |
| 2009/0118043 A1 | 5/2009 | Eitan et al. |
| 2009/0302611 A1 | 12/2009 | Masters et al. |
| 2010/0181771 A1 | 7/2010 | Roos |

* cited by examiner

FIGURE 1: SPUR GEAR TRANSGEAR

FIGURE 2: SPUR GEAR TRANSGEAR CLUTCHES

FIGURE 3: SPUR GEAR DIFFERENTIAL STEERING

FIGURE 4: INFINITELY VARIABLE MOTION CONTROL (SPEED CONVERTER)

(A) FRONT VIEW OF TWO SPEED RANGE IVMC
FIGURE 5: TWO SPEED RANGE IVMC

FIGURE 6: IVT (SPEED CONVERTER AND DIRECTION CONTROL)

FIGURE 7: IVT (SPEED CONVERTER, DIRECTION CONTROL, AND DIFFERENTIAL)

FIGURE 8: ZTR (SPEED CONVERTER AND TWO DIRECTION CONTROLS)

FIGURE 9: RECIPROCATING PUMP (A) FRONT VIEW  (B) SIDE VIEW

FIGURE 10: PITCH CONTROLLED SPEED CONVERTER

FIGURE 11: INPUT CONTROLLED SPEED CONVERTER

FIGURE 12: INPUT CONTROLLED AND INPUT COMPENSATED SPEED CONVERTER (A) MINIMUM OVERLAP  (B) MEDIUM OVERLAP  (C) MAXIMUM OVERLAP

FIGURE 13: VARIABLE TORQUE GENERATOR (A) Front View    (B) Side View of Left Transgear Figure 14: Direction Control

INFINITELY VARIABLE DIRECTION CONTROL

This application is a divisional of U.S. patent application Ser. No. 13/915,785 filed Jun. 12, 2013 (now U.S. Pat. No. 8,702,522 issued Apr. 22, 2014) which is a divisional of U.S. patent application Ser. No. 13/568,288 filed Aug. 7, 2012 now U.S. Pat. No. 8,485,933 issued Jul. 16, 2013) which claims the benefit of priority to U.S. Patent Application Ser. No. 61/521,408 filed Aug. 9, 2011, and to U.S. Patent Application Ser. No. 61/523,846 filed Aug. 16, 2011 and is a divisional of U.S. patent application Ser. No. 13/425,501 filed Mar. 21, 2012 (now U.S. Pat. No. 8,641,570 issued Feb. 4, 2014) entitled "Infinitely Variable Motion Control (IVMC) for Generators, Transmissions and Pumps/Compressors" and U.S. application Ser. No. 13/568,288 filed Aug. 7, 2012 (now U.S. Pat. No. 8,485,933 issued Jul. 16, 2013) and is a continuation-in-part of U.S. patent application Ser. No. 13/384,621 (now U.S. Pat. No. 8,388,481 issued Mar. 5, 2013), entitled "Apparatus and Method for Providing a Constant Output from a Variable Flow input" filed Jan. 18, 2012, being a national stage entry application of PCT US 10/42519 having an international filing date of Jul. 20, 2010, all applications of Kyung Soo Han and being incorporated herein by reference as to their entire contents.

TECHNICAL FIELD

The technical field of the invention relates to providing infinitely variable motion control in transmissions, wind and river turbines, and pumps and compressors and, in one embodiment, a vehicle with infinitely variable direction control and, in another embodiment with the infinitely variable direction control, with a zero turn radius (ZTR).

BACKGROUND

It is generally known in the art to provide devices such as transmissions for vehicles, wind and river turbines (particularly at dams) for the generation of clean electric energy and pumps or compressors with variable speeds. In particular, transmissions are known with many speeds and gears whereby a shifting of gears and speeds typically involves the use of a clutch device so that a range of speed may be changed, for example, through a plurality of gears to reach a maximum number of revolutions per minute of an output shaft in each of the plurality of gears while an input shaft operates within the angular velocity range of, for example, a driving motor.

Applicant has been developing a concept referred to herein as infinitely variable motion control (IVMC) whereby an input, a control, and an output provide infinitely variable control without the need for any clutch.

Wind and water are examples of renewable energy sources. Wind is variable in velocity, but is "green" and abundant. Recently the demand for wind energy has increased sharply. A more effective and efficient system for reducing the cost of energy (COE) is needed. The rotor assembly of an Old Style Wind Generator (OSWG) rotates at a constant speed and a constant speed generator generates grid compatible constant power. The generator capacity is limited to the lowest torque produced at the cut-in speed which is low. A Current Wind Turbine (CWT) is designed to generate more energy by making the rotor assembly to rotate variably from the cut-in speed to a rated speed. The generator capacity is increased from the lowest torque produced at the cut-in speed to a higher torque produced at the rated speed. The increased capacity is significant; however, the improvement comes with a power converter called a Variable Frequency Converter (VFC). VFC is an assembly of power electronics and converts variable power to grid compatible constant power. VFC is known for having a high failure rate (~26% of the total), short life (MTBF ~2 years), expensive (~$50 k to $120K for 1.5 mW capacity), and tends to cause other parts to fail prematurely (for example, main bearing and gearbox).

River turbines are normally found at locations of dams on rivers for generation of electric energy. During the great depression in the United States, the Tennessee (River) Valley Authority (TVA) was instrumental in building great dams and providing electricity for the state of Tennessee. River turbines are considered in accordance with aspects of the present invention for use within river and stream beds without the need for building large dams and suffer the loss of land to lakes which result front the building of dams. It is suggested that river turbines may be utilized in streams and rivers for generation of electricity to power communities along the rivers and streams.

In connection with other embodiments, transmissions, pumps and compressors may comprise mechanical components to introduce infinitely variable motion control and zero radius steering. In this manner, for example, more practical, economical and more efficient vehicles may be built having less costly maintenance. Moreover, it is generally recognized that there is a need in the art for more efficient transmissions, wind and river turbines, direction control and pumps and compressors which are not susceptible to costly breakdown.

Introduction to Infinitely Variable Motion Control (IVMC)

Differential Dynamics Corporation (DDMotion) has developed several different types of motion control technology to convert a given input to a controlled output. Each technology will be explained briefly first as part of the BACKGROUND. In the SUMMARY, the latest developments in infinitely variable motion controls will be described and, then, in the DETAILED DESCRIPTION of the drawings, the latest developments will be further described along with applications of the technology to some major products such as transmissions, differentials and steering for vehicles, wind and river turbines, and pumps and compressors, and at least one embodiment will be discussed directed to infinitely variable direction control and zero turn radius (ZTR) for a vehicle. Most of the concepts disclosed herein are based on the Kyung Soo Han's previous developmental work as exemplified by the patents and publications discussed briefly below.

U.S. Pat. No. 6,068,570 discusses speed control with planetary gears, speed control with spur gears, worm and worm gear control and compensated variable speed control. U.S. Pat. No. 6,537,168 discusses direction control with bevel gears and direction control with spur gears. U.S. Pat. No. 7,731,616 discusses a variable pitch cam. U.S. Pat. No. 7,462,124 discusses three variable control where the variable control comprises an input, an output, and a control. U.S. Pat. No. 7,731,619 discusses three variable control with bevel gears and three variable control with spur gears. WO2011011358A2 is a published international application of PCT U.S. 10/42519 filed Jul. 20, 2010 and claiming priority to U.S. provisional patent application 61/226,943 filed Jul. 20, 2009, which describes a speed converter with cam driven control and a variable torque generator producing a constant frequency and voltage output from a variable input. This PCT application has been filed in the United States as U.S. patent application Ser. No. 13/384,621, filed Jan. 18, 2012 (now U.S. Pat. No. 8,388,481 issued Mar. 5, 2013). Since priority is claimed to this '621 national stage entry patent application, its teachings are not to be considered prior art to the present IVMC apparatus, Applications of this speed converter/variable torque generator technology include and are not limited to applications in the field of clean energy generation such as wind and water driven electrical energy generators and to vehicular control. All of the above-identified patents and published applications are incorporated by reference herein as to their entire contents.

SUMMARY OF THE SEVERAL EMBODIMENTS OF IVMC

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

Figure 1:
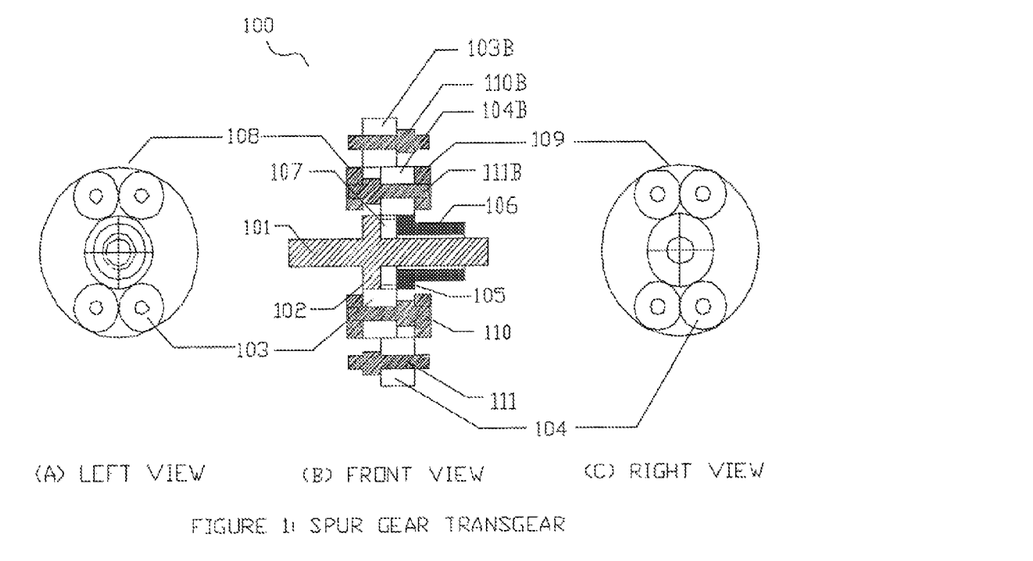
Figure 2:
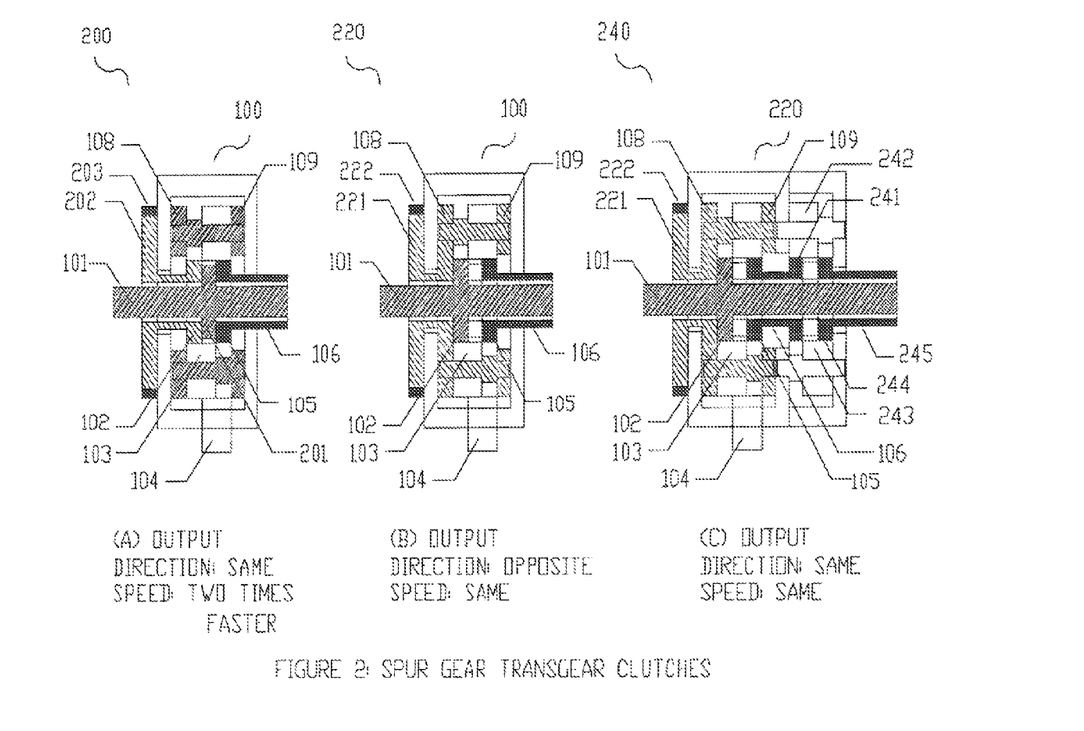

Three variable mechanical controls may be used to convert variable input to constant output or constant input to variable output. Mechanical controls are efficient and scalable. All gear assemblies having three variables, input, output, and control, will be called "transgears" in this context. As will be described in the context of FIG. 1, a spur gear transgear is utilized to form clutches per FIG. 2, differential steering per FIG. 3 and build speed converters and the like therefrom.

A first control technology described herein may be referred to as cam driven infinitely variable motion control. Cam control is thoroughly described in FIG. 7 of U.S. patent application Ser. No. 13/425,501 filed Mar. 21, 2012 (now U.S. Pat. No. 8,641,570 issued Feb. 4, 2014). A variable pitch cam assembly may comprise an eccentric inner cam 702 that comprise a portion of a shaft 701, for example, an input shaft or an output shaft. The inner eccentric cam may be positioned and free to move within an eccentric outer cam 703. The control assembly thus comprises a shaft, the inner cam and an outer cam. The control assembly may be continuously controlled from a minimum eccentricity when the shaft is located central to the cam assembly, FIG. 7(D) to a period of maximum eccentricity, FIG. 7(E), when the shaft is located most proximate to the edge of the cam assembly. In this eccentric position, when the shaft rotates, the cam assembly forms an effective cam profile as depicted in FIG. 7(E) such that the profile is in the form of a circle having a much larger diameter than when the inner and outer cams are in a least eccentric position.

A further control technology as described herein may be referred to as a ratchet bearing or a one-way clutch bearing (FIG. 8 of U.S. patent application Ser. No. 13/425,501 filed Mar. 21, 2012 (now U.S. Pat. No. 8,641,570 issued Feb. 4, 2014)). A Sprag is a trade name for such a bearing and is commercially available, for example, from Renold plc of the United Kingdom and from NMTG of India. Sprag may be used herein as a short-hand for such a bearing and assembly which is free-wheeling in one direction of rotation and engaged in the other rotation direction and may be referred to herein generally as output gears, for example, when discussing a driver and its application in a cam controlled speed converter.

An external housing 800 of such a ratchet or one-way clutch bearing (or Sprag) has at least one notch 805, 806 for receiving, for example, a needle roller 803, 804 and the needle roller such that when an internal race is moving in one rotational direction, the outer housing may move in either direction and be free-wheeling (or vice versa, if the outer housing rotates, the inner race 801 may move) because the needle roller 803, 804 is loose or free-wheeling and located at one end of its associated notch. On the other hand, when the internal race 801 rotates in the other rotational direction with respect to the outer housing 802 or vice versa, the needle roller 803, 804 rolls into an engaged position between the race and the notch such that the housing 802 is controlled to rotate in this other rotational direction with the inner race 801.

A further control technology is accomplished when the cam controlled assembly technology described above is used as a driver (FIG. 9 of U.S. patent application Ser. No. 13/425,501 filed Mar. 21, 2012 (now U.S. Pat. No. 8,641,570 issued Feb. 4, 2014)). A Sprag, 912, 913 is embedded inside an output gear 910, 911 and the race of the ratchet bearing or one-way clutch is attached to the output shaft for rotation in one direction.

A speed converter using the above described technology may have infinitely variable direction control comprising first and second transgear assemblies surrounding an input shaft having displaced sun gears. A first actuated brake may achieve a forward direction while a second actuated brake may achieve a reverse direction. Having first and second such infinitely variable direction controls assembled to either side of an output shaft of an infinitely variable speed converter achieves zero turning radius (ZTR).

A rotor blade has a pitch used, for example, to capture renewable energy such as wind energy or water energy which causes a rotor to rotate and so turn an input shaft (FIG. 17 or 18 of U.S. patent application Ser. No. 13/425,501 filed Mar. 21, 2012 (now U.S. Pat. No. 8,641,570 issued Feb. 4, 2014)). Rotor blade pitch may be controlled to further control the control technologies introduced above to achieve a pitch-controlled infinitely variable motion control to provide, for example, a relatively constant velocity output from a variable velocity input.

Finally, input compensated infinitely variable motion control (FIG. 22 of U.S. patent application Ser. No. 13/425,501 filed Mar. 21, 2012 (now U.S. Pat. No. 8,641,570 issued Feb. 4, 2014)) may comprise two independent inputs, a drive input and a control input, and an output for a three variable control motion control. A system of variable output may be achieved by releasing the drive input so that the output may be varied.

These several technologies will be further described with reference to particular applications in generators, transmissions and compressors or pumps and are depicted in the drawings, a brief description of which follows.

BRIEF DESCRIPTION OF THE DRAWINGS

The features and advantages of the present invention will become more apparent from the detailed description set forth below when taken in conjunction with the drawings in which like reference numbers may indicate identical or functionally similar elements.

FIG. 1(A), 1(B), and 1(C) provide a mechanical diagrams of a spur gear transgear assembly wherein FIG. 1(A) is a left view. FIG. 1(B) is a front view and FIG. 1(C) is a right view and wherein a spur gear transgear assembly is a building block of embodiments described below wherein the present spur gear transgear assembly may be preferred for embodiments described herein, but other types may be used as appropriate as described in U.S. patent application Ser. No. 13/384,621 (now U.S. Pat. No. 8,388,481 issued Mar. 5, 2013). FIGS. 1-6, incorporated herein by reference as to its entire contents.

FIGS. 2(A), 2(B) and 2(C) provide mechanical diagrams of spur gear transgear clutch embodiments wherein FIG. 2(A) depicts a first embodiment; FIG. 2(B) depicts a second embodiment and FIG. 2(C) depicts a third embodiment, the spur gear transgear clutch most practically being actuated by a brake wherein a transgear clutch embodiment as depicted and described herein is compact, non-grinding and economical to manufacture and maintain.

FIGS. 4(A) and 4(B) provide an overview mechanical diagram of an Infinitely Variable Motion Control (IVMC) speed converter wherein FIG. 4(A) is a front view and FIG. 4(B) is a sectional view. This is a variable pitch cam controlled IVMC. The output is infinitely variable from zero to a designed or predetermined maximum speed.

FIGS. 5(A) and 5(B) provide an overview mechanical diagram in FIG. 5(A) and speed range graph in FIG. 5(B) for a Two Speed Range IVMC. City driving of a typical vehicle is stop-and-go while highway driving is an over-drive (typically at a constant high speed with few stops except for emergencies). By adding a by-pass circuit, the highway driving can be done by the engine and the IVMC system can be by-passed in this embodiment.

FIGS. 10(A) and 10(B) provide an overview mechanical diagram of a Pitch Controlled Speed Converter (useful, for example, in wind or river electricity generation) wherein FIG. 10(A) provides a front view and FIG. 10(B) provides a side view. When the variable input (such as wind speed or water flow rate) rotates a rotor, the variable input can be convened to a constant output by controlling the rotor blade pitch with a feedback and/or a feedforward control system.

FIGS. 11(A), 11(B) and 11(C) provide an overview mechanical diagram of an Input Controlled Speed Converter wherein FIG. 11(A) is sectional view; FIG. 11(B) is a top view; and FIG. 11(C) depicts an alternative embodiment of a hatch assembly input control. The embodiment may lie at the bottom (or under the water surface) of a river, a stream or near an ocean shore for capturing wave or tidal motion and energy. The kinetic energy of flowing water is high and the harnessing members must be durable. An embodiment of this system is a fixed pitch waterwheel with a hatch which is opening or closing depending on water flow to control the input flow.

FIGS. 12(A), 12(B) and 12(C) provide an overview mechanical diagram of an Input Controlled and Input Compensated Speed Converter wherein

FIGS. 13(A), 13(B) and 13(C) provides an overview mechanical diagram of a Variable Torque Generator (VTG) which may be continuously adjusted from minimum to maximum torque wherein FIG. 13(A) shows minimum overlap of a rotor and a stator; FIG. 13)B) shows medium overlap between a rotor and a stator and FIG. 13(C) shows maximum overlap between a rotor and a stator. To minimize the cut-in speed and maximize the energy harnessing, the generator rotor and stator overlap is continuously controlled.

FIGS. 14A and 14B provide a further embodiment of infinitely variable direction control as first presented as FIG. 12 of U.S. patent application Ser. No. 13/425,501 of the same inventor filed Mar. 21, 2012 (now U.S. Pat. No. 8,641,570 issued Feb. 4, 2014 and described therein as an overview of direction control for a transmission involving non-grinding direction control (forward to reverse and vice versa) and constructed with two spur gear transgears wherein one of a bevel gear transgear, a ring gear planetary gear assembly and a spur gear transgear assembly may be used wherein FIG. 14A provides a cross-sectional front view and FIG. 14B provides a side view of the transmission and direction control.

These applications of variations and technologies of infinitely variable motion control (IVMC) with respect to embodiments of transmissions, wind and river turbines and pumps/compressors will be further described in the detailed description of the drawings which follows.

DETAILED DESCRIPTION

The present invention is directed to applications of infinitely variable motion control (IVMC) in transmissions, wind and river turbines, and pumps/compressors wherein transgears are used for control, for example, spur gear transgears. A spur gear transgear will be described with reference to FIG. 1(A), 1(B) and 1(C) however, a plurality of embodiments of a spur gear assembly may be utilized, to advantage as alternatives in accordance with U.S. application Ser. No. 13/384,621 (now U.S. Pat. No. 8,388,481 issued Mar. 5, 2013), FIGS. 1-6. incorporated herein by reference as to its entire contents.

Transgear: Spur Gear Transgear

A spur gear assembly 100, for example, shown in FIG. 1(A), left view, FIG. 1(B), front view, and FIG. 1(C), right view, is an example of a transgear assembly having an input (input shaft 101 is driven from the left), an output (sleeve 106 provides the output), and a control (a mechanical concept similar in concept to an electronic transistor) such as a carrier assembly provided by a series of planetary gears, carrier brackets and pins. Spur gear transgears may be used as differentials, but their applications as controls may be virtually unlimited.

Referring to left view FIG. 1(A) and front view FIG. 1(B), an input gear comprising a left sun gear 102 is attached to and may be integral with input shaft 101 (seen in the center of corresponding front view FIG. 1(B)). Planetary gears 103 and 103B are meshed to left sun gear 102, and planetary gears 104 and 104B are meshed to right sun gear 105. The planetary gears 103 and 104, and 103B and 104B are meshed respectively. Right sun gear 105 may be attached to or integral with right sun gear sleeve 106 which surrounds shaft 101 and provides the output. Other components of transgear assembly 100 include left carrier 108 and right carrier 109, each of which may be a disc or gear. Components 110, 110B, 111 and 111B comprise pins. The assembly 100 thus comprises a spur gear transgear with input, output and control. Assembly 100 is very similar in mechanical diagram to the spur gear assembly of FIG. 3 of U.S. application Ser. No. 13/384,621 filed Mar. 21, 2012 by Mr. Han (now U.S. Pat. No. 8,388,481 issued Mar. 5, 2013).

The elements of the drawings denoted with "B" at the end of each reference numeral, (see, for example, FIG. 1(B), reference numerals 103B, 104B, 110B and 111B), refer to an extra set of components, such as carrier portions and gears for enhanced, more balanced performance. For example, gear 103B may, however, provide greater torque capacity and dynamically balance the spur gear transgear system 100.

Spur gear transgears may basically comprise two sun gears 102, 105, meshed with each other through planetary gears 103, 104. Spur gears may be either regular spur gears or helical gears.

Referring to FIG. 1(B), front view, left sun gear 102 is attached to or integral with input shaft 101. Carrier brackets 108 and 109 are attached together with pins 110 and 111. Planetary gears 103 and 104 may rotate freely around the pins 110, 111 and mesh with sun gear 102 (input) and sun gear 105 (output) respectively. Thus, the output 105 having sleeve 106 is controlled by the planetary and sun gears forming a basic spur gear transgear assembly 100.

Assume that input rotational energy is connected to input shaft 101 and so shaft 101 rotates clock-wise and the carriers 108, 109 and pins 110, 111 are fixed. Left sun gear 102 is the input gear and right sun gear 105 is the output gear connected to an output sleeve 106. The input sun gear 102 may rotate clock-wise (CW) with the input shaft 101. Planetary gear 103 then rotates counter clock-wise (CCW), and planetary gear 104 rotates clock-wise (CW), and right sun gear 105 of the output rotates CCW along with output sleeve 106. Since the sun gears 102 and 105 are the same size in diameter as seen in FIG. 1(B), the angular rotation will be same at input and output, but the input and output rotate in opposite directions from one another. This spur gear transgear 100 with the same size sun gears may be called a "basic transgear."

Spur Gear Transgear Clutches

Embodiments of Spur Gear Transgear Clutches are shown in FIGS. 2(A), 2(B) and 2(C). Similar reference numerals are used in FIGS. 2(A), 2(B) and 2(C) to denote similar elements where the first digit indicates the figure number where the element first appears. For example, shaft 101, left sun gear 102 and so on having the same names appear as similar components with similar function in FIGS. 2(A), 2(B) and 2(C) as in FIGS. 1(A), 1(B) and 1(C). Elements beginning with the numeral 2 denote elements first introduced in FIGS. 2(A), 2(B) and 2(C) such as center block 201 and brake disc 202 (attached to left sun gear 102 through a sleeve). FIG. 2(A) shows an output direction being the same direction (for example, both input and output are CW) but with the output speed (rotational velocity) being two times faster. FIG. 2(B) shows an output direction being opposite, i.e., the input shaft 101 may be CW and the output sleeve 106 CCW and the output rotational velocity or speed being the same at input and output. FIG. 2(C) shows an output direction being the same, i.e., the input shaft 101 may be CW and the output sleeve 245 CW, and the output rotational velocity or speed being the same at input and output.

Referring to FIG. 2(A), embodiment clutch 200, Center block 201 may be either attached to or is integral with shaft 101. Brake Disc 202 is attached to left sun gear 102 through an associated sleeve proximate to input shaft 101. Band brake 203 of brake disc 202 (or alternative brake mechanism known in the art) is shown in black and may denote a braking mechanism inside a vehicle operated by a vehicle operator. The input is the carrier through a center block 201 and the output is right sun gear 105. The control is left sun gear 102. Since the planetary gears are rotating around the stationary left sun gear 102, and the sun gears are the same in size, the right sun gear 105 rotates two times faster than the input shaft 101. This is the same as in a bevel gear transgear. With respect to the direction, the input may be CW. As the carrier rotates CW, planetary gear 103 rotates CW, planetary gear 104 CCW and right sun gear 105 CW. So the output direction is the same as the input direction in this embodiment.

As shown in either FIG. 2(B), clutch embodiment 220, or FIG. 2(C), clutch embodiment 240 are shown with no brake disc 202 provided. On the other hand, braking is similar. Brake Disc 221 is attached to a sleeve which in turn couples with pins and carriers, carrier 108, in particular. Pressure applied via band brake 222 brakes the speed of carriers 108 and 109. The input is left sun gear 102, the carrier is the control and the right sun gear 105 is the output. So left sun gear 102 may turn CW, 103 CCW, 104 CW and 105 CCW. So the output direction CCW may be opposite the input CW. The speed is the same since the sun gears are the same size as explained above with reference to FIG. 1.

FIG. 2(C), clutch embodiment 240, starts with the basic embodiment of FIG. 2(B), embodiment 220, and adds additional components for providing the same direction at output as input. Gear 241 is attached to or may be integral with right sun gear sleeve 106. Two direction change gears are provided, direction change gear #1 242 and direction change gear #2 243. Direction change gear #1 is meshed to gear 241 and direction change gear #2 is meshed to an output gear 244 of output gear sleeve 245 and to direction change gear #1 242.

Spur Gear Transgear Differential Steering Assembly

Figure 3:
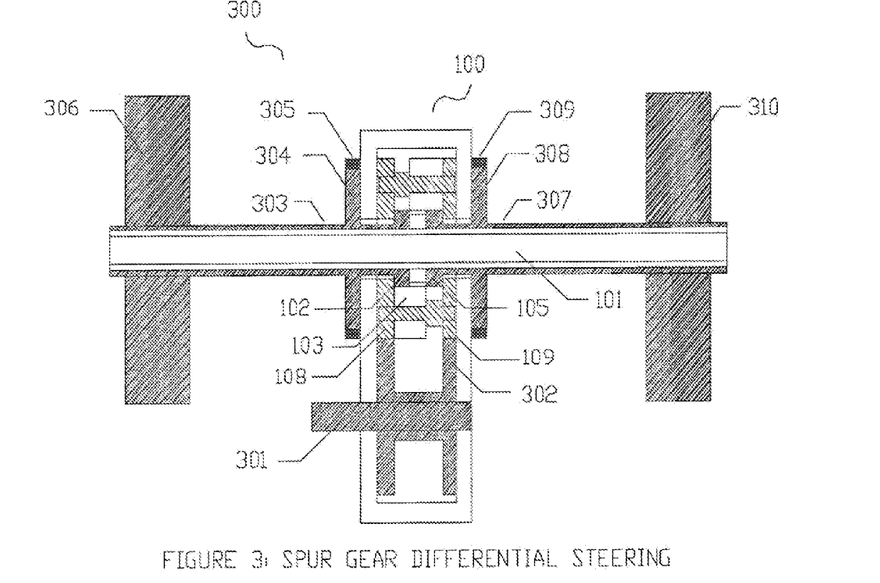
FIG. 3 provides an overview mechanical diagram of a spur gear transgear differential steering assembly that comprises a speed controlled steering system such that by braking one side of a differential, the other side will be speeding up faster. The concept may be considered opposite in concept to differential reaction to the steering.

Referring now to FIG. 3, there is shown a mechanical diagram for providing spur gear transgear differential steering. Shaft 101 is shown not attached to or integral with any members; (shaft 101 is a support member). Left sun gear 102 is attached to sleeve 303. As before, planetary gear 103 is shown with left sun gear 102. Carriers 108 and 109 are similarly shown. Right sun gear 105 may be attached to or integral with an output sleeve 307.

New to FIG. 3 are input shaft 301 displaced from shaft 101. Shaft 101 may just be a support shaft but can be attached to or be integral with one of the sleeves 303 or 307 and so reduce the number of parts in an alternative embodiment. Input shaft 301 is coupled to input gear 302 associated with left carrier 108 and right carrier 109. Sleeve 303 is attached to or integral with left sun gear 102. For braking, brake disc 304 is attached to sleeve 303. Pressure applied to band brake 305 is felt at sleeve 303 which is attached to left driving wheel 306 and so slows a left wheel. Similarly, on the right, sleeve 307 is attached to or integral with right sun gear 105. For braking, brake disc 308 is attached to sleeve 307. Pressure applied to band brake 309 is felt at sleeve 307 which is attached to right driving wheel 310 and so slows a right wheel. When one wheel slows down, the other wheel may speed up for steering in the direction of the slower wheel.

IVMC Speed Converter

Referring now to FIGS. 4(A) and 4(B), an infinitely Variable Motion Control (IVMC) speed converter comprises an input shaft 403 and an output shaft 424 with a shaft 101 serving as a cam shaft. IVMC speed converter further comprises a variable pitch cam (inner cam 420, outer cam 422) surrounding earn shaft 101 and is shown in Section A-A of FIG. 4(B) embedded in front view FIG. 4(A). A variable pitch cam is extensively shown and described in connection with the description of FIG. 7(A) through 7(E) of U.S. application Ser. No. 13/425,501, filed Mar. 21, 2012 (now U.S. Pat. No. 8,641,570 issued Feb. 4, 2014), incorporated by reference as to its entire contents. Inner cam 419 and outer cam 421 form a similar variable pitch cam surrounding cam shaft 101. At the bottom of Section A-A, FIG. 4(B), is a Sprag gear assembly surrounding output shaft 424 having race section 423. Race section 423 of output shaft 424 couples with Sprags 429, 430, 431 and 432 and having output gears 425, 426, 427, 428 designated together but seen separately. Together section AA forms a driver 416 which is duplicated in FIG. 4(A) as driver 415. Pins 413, 414 are designated together and associated with slots 409, 410, 411 and 412 discussed further below.

Figure 4:
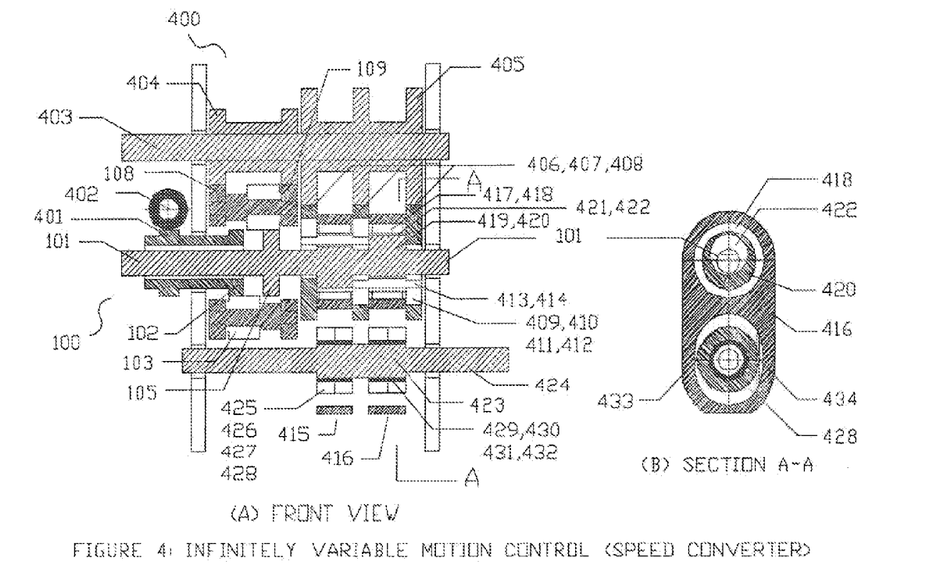

To the left of FIG. 4(A) is seen a spur gear transgear assembly 100 comprising cam shaft 101, left sun gear 102 integral or attached to a sleeve surrounding cam shaft 101, planetary gear 103 integral with or attached to cam shaft 101, carriers 108, 109 (see FIGS. 1(A) through 1(C)), pins 110, 111 (not marked) and so on. With respect to newly shown components, in FIG. 4. worm 402 turns worm gear 401 which is attached to or is integral with input shaft 403 and meshed to carrier gears 108 and 109 of spur gear assembly 100. A drive gear 405 is attached to input shaft 403 and meshed to slotted gears 406, 407 and 408, where slotted gear 406 has one slot at the top, slotted gear 407 has two slots, one at the top and one at the bottom, and slotted gear 408 has one slot at the bottom. Slots 409, 410, 411 and 412 are designated together where slot 410 and slot 411 are at the middle of slotted gear 407. The operation of slotted gears is described by reference to FIGS. 10 and 11 of U.S. application Ser. No. 13/425,501 filed Mar. 21, 2012 now U.S. Pat. No. 8,641,570 issued Feb. 4, 2014), incorporated by reference in its entirety.

IVMC with Two Speed Ranges

Figure 5:
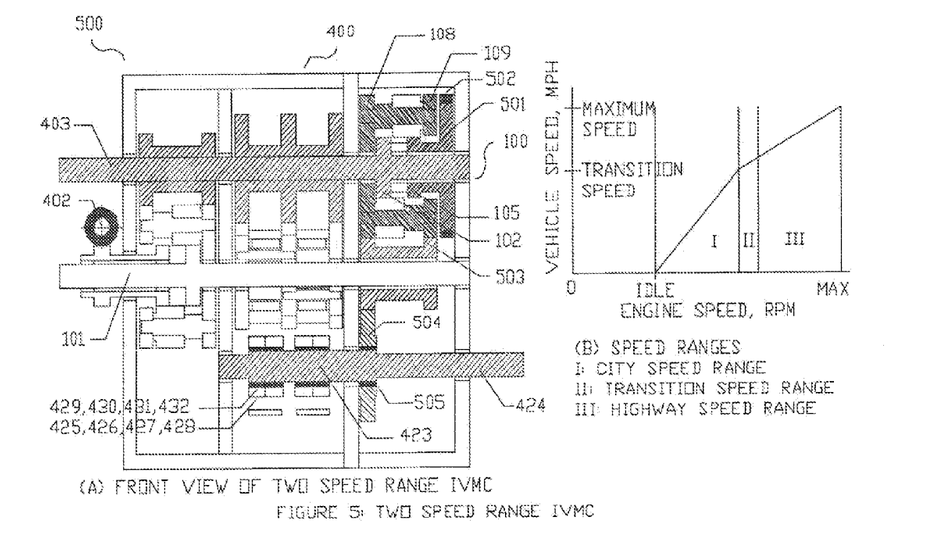

Referring to FIG. 5(A), there is shown an IVMC with two speed ranges, city I and highway III, and a transition speed range II as seen from graph FIG. 5(B). The IVMC speed converter 400 of FIGS. 4(A) and 4(B) has been so modified and may be enclosed in an outer housing including a brake system and be, for example, in the form of a vehicle. IVMC 500 operable at city and highway speeds is modified from FIGS. 4(A) and 4(B) by further including brake disc 501 and band brake 502 for input shaft 403. Moreover, additional gears are provided including gear 503 surrounding cam shaft 101, and output gear 504 surrounding output shaft 424 where output gear 504 further has an associated Sprag 505. Note that in an alternative embodiment, gear 503 may not be needed if carrier gears 108 and 109 are meshed to output gear 504 directly. Operationally, when the band brake 502 is engaged, output gear 504 may rotate in the same direction but faster than output gears 425, 426, 427 and 428.

Infinitely Variable Transmission or IVT (Speed Converter and Direction Control)

Figure 6:
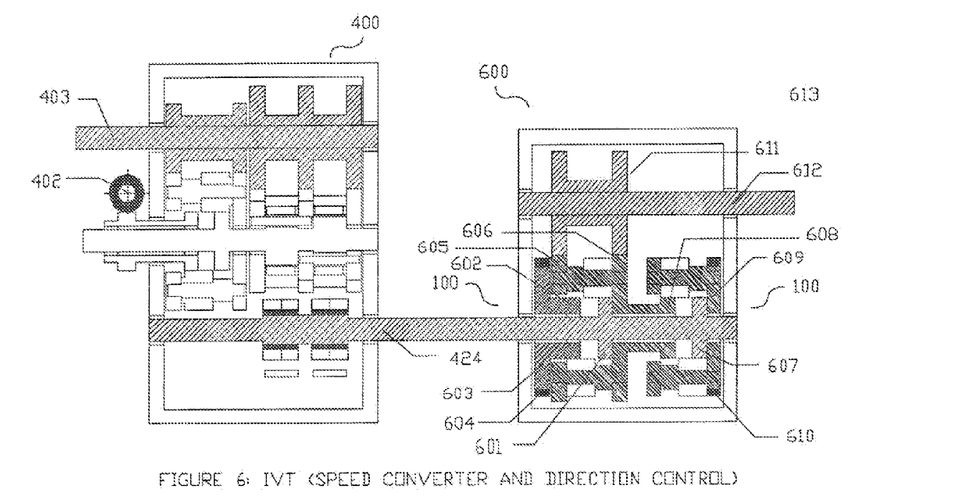
FIG. 6 provides an overview mechanical diagram of an Infinitely Variable Transmission (IVT). This IVMC transmission is a speed converter with a direction control and so provides a forward, neutral and reverse direction.

Referring to FIG. 6, there is shown a combination of the IVMC speed converter 400 of FIG. 4(A) with the addition of a direction control. A discussion of FIGS. 4(A) and 4(B) will not be repeated and the emphasis will be placed on direction control 600 wherein input shaft 403 and worm 402 are shown. Output shaft 424 extends from speed converter 400 to direction control 600 and comprises right sun gear 601 (similar to a right sun gear of spur gear transgear 100 of FIG. 1(B)). Left sun gear 602 is likewise similar to a left sun gear of spur gear transgear 100. As shown, spur gear transgear assemblies are shown side-by-side with first and second sun gears 601, 607 integral with or attached to shaft 424 but spaced apart from one another longitudinally on the shaft 424. Brake disc 603 is operated by band brake 604. Carrier gears 605 and 606 are likewise similar to the carrier gears of transgear assembly 100, left side. Right sun gear 607 is similar to the right side of spur gear transgear 100 (FIG. 1(B)). Left sun gear 608 is attached to or integral with carrier gear 606 which is similar to the right side of spur gear transgear 100. Further braking is provided by right carrier and brake disc 609 operated by band brake 610. Output shaft 612 is now able to operate in forward, neutral and reverse where output gear 611 is meshed to carrier gears 605 and 606. Assume that the shaft 424 is rotating one revolution CW. If band brake 604 is applied (braked), carrier brackets 605 and 606 will rotate one half rotation CW. If band brake 610 is applied (braked) the carrier will rotate one revolution CCW. In this manner, forward and reverse direction control are achieved without clutches or grinding of gears. When the hand brakes 604 and 610 are not applied (not braked), the carrier will be free or neutral.

Infinitely Variable Transmission IVT with Differential

Figure 7:
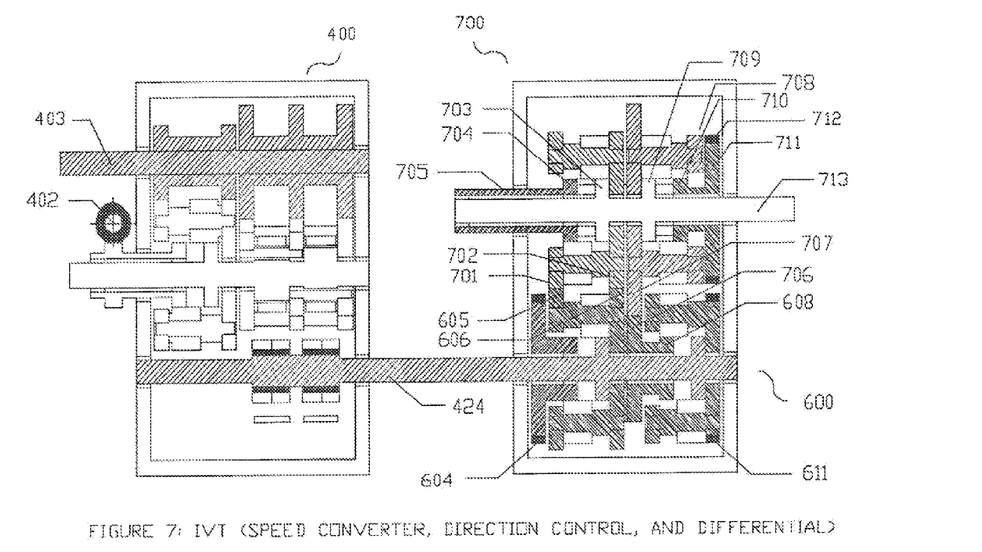
FIG. 7 provides an infinitely variable transmission (IVT) with a built-in Differential where IVT is an IVMC with a direction control. The differential can be open or locked. This embodiment comprises a compact transaxle.

Referring to FIG. 7, there is shown a combination of the IVMC speed converter 400 of FIG. 4 with the addition of direction control and a differential. Neither speed converter elements designated in the 400 series nor direction control elements designated in the 600 series will be described again in detail. Attention will be focused on new differential elements designated in the 700 series. Direction control and differential 700 are driven by shaft 424 from speed converter 400. The right differential shaft 713 is coupled to shaft 424 by directional control comprising a band brake 604 and 611. Carrier gears 605, 606 are shown as is left sun gear 608 which may be attached to or integral with output gear 706.

The differential portion of direction control and differential 700 comprises elements 701-713. Referring to the spur gear transgear of FIGS. 1(A), 1(B) and 1(C), carrier gear 701 (Left side of spur gear transgear 100) and carrier gear 702 are similar as are right sun gear 703 and left sun gear 704. Left differential output sleeve 705 surrounds right differential output shaft 713. Brake disc 711 is operated by band brake 712 on differential output shaft 713. Left sun gear output gear 706 is similar to the right side of spur gear transgear 100. Left carrier gear 707 is likewise similar to the right side of spur gear transgear 100. Right carrier 708 is similar to the right of transgear 100 and left sun gear 709 is also similar to the right of spur gear transgear 100. Right sun gear 710 is similar to the right sun gear of spur gear transgear 100. The differential can be open or locked. This embodiment comprises a compact transaxle. There are two outputs from the direction control: carrier gears 605 and 606, and gear 706 that is attached to left sun gear 608 and carrier gear 606. Carrier gears 605 and 606 are meshed to carrier gears 701 and 702. The gear ratios are, for example, one to one. Gear 706 is attached to left sun gear 608 and is meshed to carrier gear 707, and the ratio is, for example, one to two. If the direction control output is one revolution CW, carriers 701 and 702 will be rotating one revolution CCW, and carrier 707 will be rotating one half revolutions CCW. When band brake 712 is not engaged, the differential outputs are sleeve 705 to the left and shaft 713 to the right. The input to carrier 707 is not in effect. This state is now an open differential. When band brake 712 is engaged or right sun gear 710 is fixed and not rotating, left sun gear 709 will be rotating one revolution CCW. Since left sun gear 709 and right sun gear 703 are attached to shaft 713, left sleeve 705 does not have freedom to rotate. This means that the differential is rotating one revolution CCW without freedom, or is locked.

An IVMC Speed Converter with Zero Turn Radius (ZTR)

Figure 8:
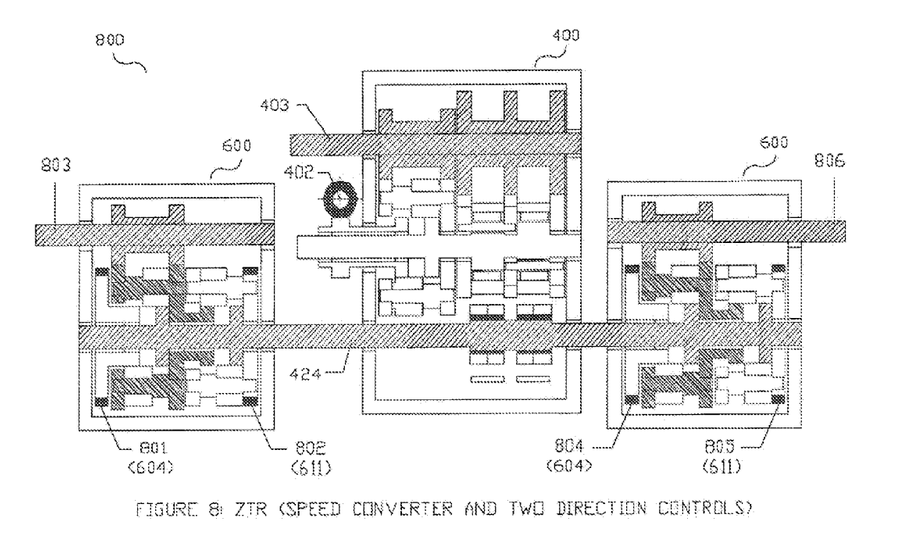
FIG. 8 provides an overview mechanical diagram for a Zero Turn Radius (ZTR) speed converter with direction controls. An IVMC with two direction controls can make two driving wheels turn independently (one forward and one reverse) and so provide a ZTR.

Referring to FIG. 8, there is shown an IVMC speed converter of FIGS. 4(A) and 4(B) having an output shaft 424 which drives two direction control assemblies according to FIG. 6, one assembly 600 on the left of speed converter 400 and one on the right of speed converter 400. With first and second direction control assemblies, one can achieve a zero turn radius (ZTR). In the embodiment of FIG. 8, shaft 803 may be turned clock-wise (or CCW) at the same time as shaft 806 may be turned counter clock-wise (or CW). In this manner, a vehicle may be turned "on a dime" with zero turn radius. The zero turn radius is achieved by appropriate actuation of band brakes 801, 802, 804, 805 where brake bands 801 and 804 comprise left band brakes and 802 and 805 comprise right band brakes. Band brakes 801 and 802 operate oppositely on left output shaft 803 in concert with band brakes 804 and 805 operating oppositely on right output shaft 806. In a ZTR left turn, shaft 803 turns oppositely from shaft 806 so that 803 moves a vehicle downward on the drawing sheet and shaft 806 moves the vehicle upwards on the drawing sheet so that the turning radius is defined by the width of the vehicle or between wheels (not shown) which would be attached to the shafts 803, 806. Note that in an alternative embodiment, instead of one IVMC and two sets of direction controls, two sets of IVMC 400 and direction control 600, one set for a left wheel and one set for a right wheel may also be employed to construct a ZTR steering. A vehicle engine (not shown in FIG. 8) may turn the shaft 403 of one or both speed converters. In a further alternative embodiment, a ZTR 800 may be replaced with a hydraulic system consisting of two sets of hydraulic pumps consistent with hydraulic principles well known in the art to form a hydraulic ZTR.

A Reciprocating Pump Driven by a Speed Converter

Figure 9:
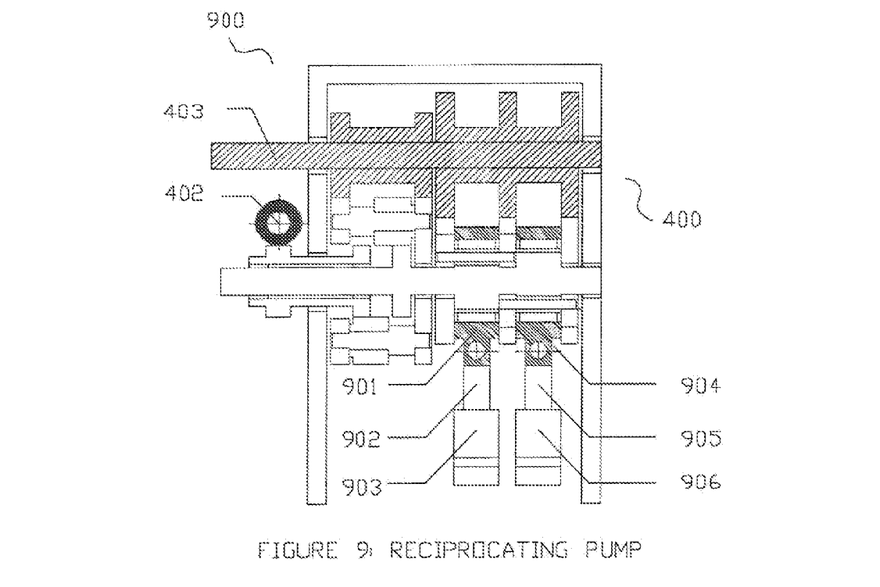
FIG. 9 provides an overview mechanical diagram of a Reciprocating Pump which may be used to advantage in many applications. By replacing the drivers with pistons, the mechanical drive system can be changed to hydraulics. The output of the depicted reciprocating pump is infinitely variable from zero to the designed maximum.

Referring now to FIG. 9, there is shown a reciprocating pump 900 driven by an IVMC speed converter 400 per FIG. 4 having worm 402, shaft 403 and piston components labeled in the 900 series of reference numerals. In reciprocating pump 900, the IVMC speed converter 400 operates reciprocating piston drivers 901 and 904 (or more pistons in alternative embodiments) with piston arms 902, 904 and pistons 903, 906 shown. For example, piston driver 901 operates piston arm 902 for actuating piston 903, Pitch Controlled Speed Converter Referring to FIGS. 10(A) and 10(B), there is shown a variation of spur gear transgear clutch 240 with clutch components of FIG. 2(C) driven by a blade assembly of variable pitch shown in front view or FIG. 10(A) and side view or FIG. 10(B). A feedback control box 1010 is introduced to control pitch of the rotor blades in, for example, an application where the pitch controlled speed converter is utilized, for example, with a variable wind source of variable wind speed and a constant output speed or output angular velocity when the generation of electricity is desired. In particular, same output direction, same speed spur gear transgear clutch 240 comprises shaft 101, left sun gear 102, left carrier 108 from FIGS. 1(A), 1(B) and 1(C), output gear 244 and output gear sleeve 245 from FIG. 2(C) and a number of components labeled 1001-1012. Platform 1012 may be located, for example, on a river bed for capturing river flow or on a land mass or on an ocean platform to capture renewable energy flow or current velocity. Preferably, the rotor is pointed and controlled to point into a direction of renewable energy, wind or water, flow. Gearbox 1011 sits on platform 1012 and houses components and may be rotated to face the direction of renewable energy flow. Worm 1009 operates worm gear 1008 as discussed above. In front view, FIG. 10(A), a rotor assembly comprises rotor blades of variable pitch mounted to a plurality, for example, four of bevel gear shafts attached to associated bevel gears. For example, in a four blade assembly, bevel gear 1002 may be a top bevel gear and bevel gear 1004 may be a bottom bevel gear with left and right bevel gears not identified but shown. In side view, FIG. 10(B), bevel gear 1001 couples to bevel gears of the rotor blade assembly shown in front view FIG. 10(A) and is attached to or integral with the shaft 101. Right bevel gear 1006 is shown on the right side of the blade assembly and is attached to or integral with output gear sleeve 245 and output gear 244 shown in black. Rotor blade 1005 is an example of one of a plurality of, for example, four rotor blades whose pitch may be varied from facing into the wind or water flow so as to not turn at all in the face of renewable energy flow or to a maximum pitch where the rotor may turn at a maximum angular velocity in one direction, for example, clock-wise. Bevel gears 1001 and 1007 may be housed in housing 1007.

Figure 10:
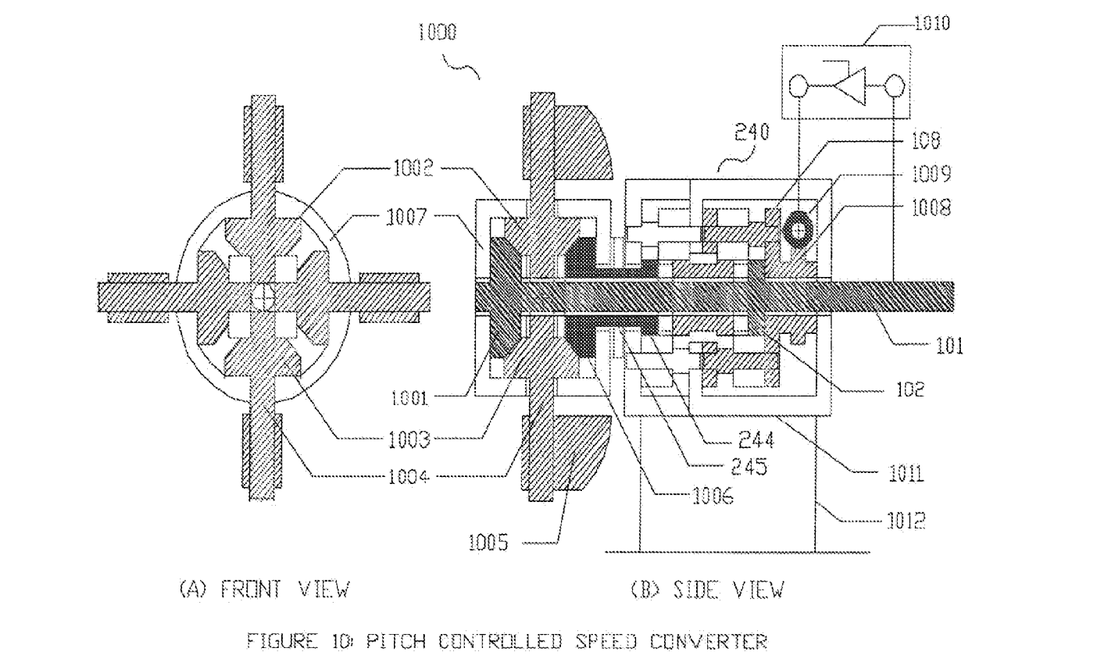

Control box 1010 senses the revolutions per minute of shaft 101 turned by the rotor blade assembly and controls worm 1009. Worm 1009 in turn may operate to control the pitch of the blade in high/low renewable energy flow velocity situations to turn the blade assembly so as to force blade 1005 to allow wind or water to flow to attempt to minimize turning the blade (for example, in extremely high wind situations) or to turn at maximum velocity thus controlling output rotational velocity to a relatively constant speed with varying renewable energy flow conditions.

Water (River) Turbines

Figure 11:
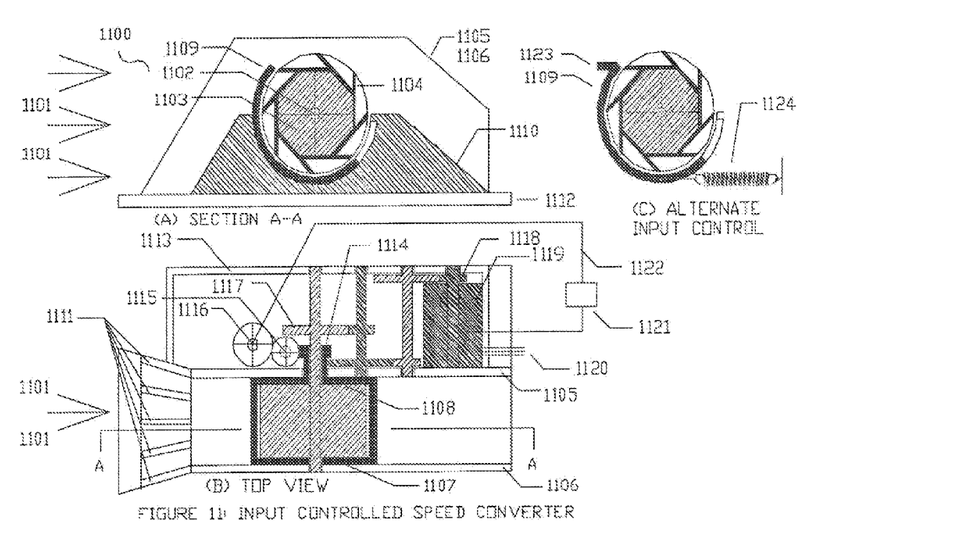
Figure 12:
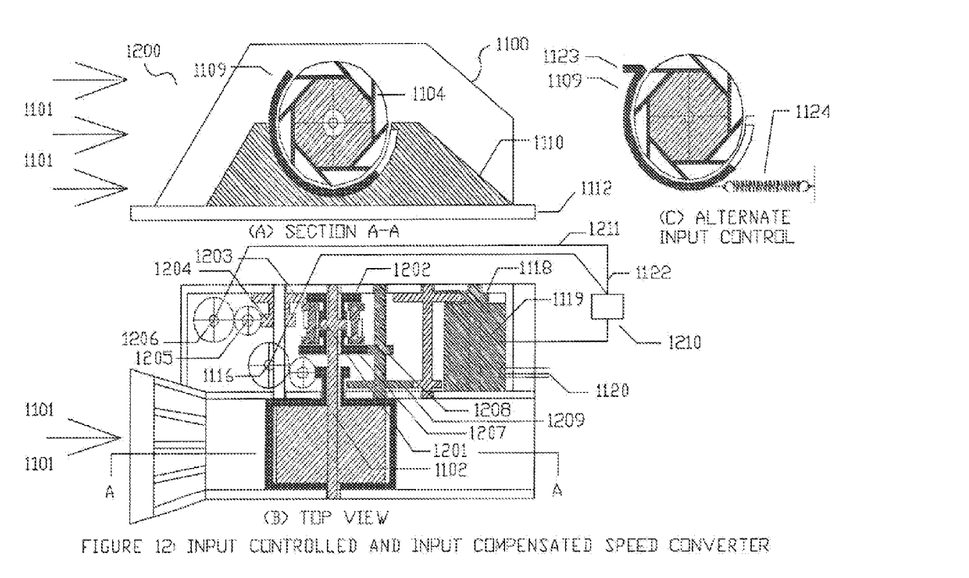
FIG. 12(A) is sectional view.
FIG. 12(B) is a top view.
FIG. 12(C) depicts an alternative embodiment of a hatch assembly input control. In this embodiment, if the flow speed is erratic and the hatch control is not adequate, another control system can be added. The input compensating system is releasing overshoot to make the output constant. The releasing is different from the driving and the required force is much less than the driving.

Referring now to FIGS. 11(A), (B) and (C) and 12(A), (B) and (C), there are shown alternative designs of, for example, a river turbine that may be mounted on a platform plate 1112. Platform plate 1112 may be elevated above river bottom by a platform (not shown) and towards the center of the river, depending on the circumstances and the river or stream or ocean environment, to receive maximum water flow. Water (river) turbines as envisioned are desirably placed at a maximum flow location of a river or stream or in a position proximate to an ocean shore where the placement is between high and low tides and for maximum water renewable energy flow. River traffic and recreational use as well as recreational use of an ocean shore line may be considered when placing the present embodiments. Water (river) turbine embodiment 1100 of FIG. 11(A), (B) and (C) is shown in FIG. 11(A) as sectional view A-A, top view in FIG. 11(B) and alternate input control hatch embodiment FIG. 11(C). The water (river) turbine of FIG. 12 is shown similarly.

Referring to FIG. 11(A), there is seen platform 1112 on which is provided turbine 1100 for receiving renewable energy water flow from flow direction 1101. Ribs 1111 also help protect the turbine from debris. Turbine 1100 comprises waterwheel brackets 1105, 1106 and flow control bracket 1110. On flow control bracket 1110 is shown hatch 1109 comprising a portion of a circle which may be permitted to revolve in an associated circular slot from a wholly closed or raised position to receive less water flow to a position where hatch 1109 is wholly enclosed in the circular slot of flow control bracket 1110 and so wholly open to receive maximum water flow. The hatch assembly may mostly resemble a can with part of the hatch (circular pipe section) cut out or removed (per FIG. 11(A)). Hatch brackets 1107, 1108 preferably comprise round discs. Waterwheel rotor blade assembly 1104 is attached to or integral with rotor drum 1103 and rotates on waterwheel shaft 1102 when water flows to push the blades at a rotational velocity depending on water flow rates and operation of the hatch. The batch opening and closing may be controlled by water flow sensors to provide constant speed output. A waterwheel drum 1103 couples the multiple blades 1104 (for example, eight blades are shown) to the shaft 1102.

Referring now to FIG. 11(B), there is seen in top view a number of protector ribs 1111. These may serve at least two functions. They may protect the inner assembly from floating/travelling large and heavy debris moved by the river or water flow 1101 such as branches or trunks of trees toward the unit and so cause the debris to flow past the turbine 1100. Also, the ribs 1100 may be contoured inward so as to accelerate water flow toward a narrower passage through the turbine. Scaled gearbox 1113 encases all gears, control box and servo motor required of the turbine 1100. Waterwheel brackets 1105, 1106 are shown in FIG. 11(B) with hatch brackets 1107 and 1108 inside. The hatch brackets also serve as protectors from debris. Control box 1121 may sense generator output, voltage and rotational velocity in revolutions per minute and send a signal to servo motor 1116 to open or close the hatch 1109 so as to achieve, for example, constant output speed. In this manner, the speed of output shaft 1102 may be controlled with variable input to achieve a desired rotational velocity output. Servo motor 1116 gear (not numbered) meshes worm 1115 and a further worm 1114 and is controlled by control box 1121 and control cable 1122 connects these. Worm gear 1114 is attached to hatch bracket 1108 and worm 1115 is meshed to worm gear 1116. Constant speed generator 1119 is connected to control box 1121 to increase or decrease ratio increase gear 1118. The output of the water (river) turbine is generator output cable 1120 shown as a three phase power alternating power cable. In an alternative embodiment and referring to FIG. 11(C), a spring-loaded hatch with lips or ribs 1123 on the flow-in direction 1101 side is shown. Water flowing toward lip or rib 1123 tends to cause the hatch to rise and cover the waterwheel assembly depending on the flow rate. Spring 1124 impedes the covering of the waterwheel assembly. Such a spring-loaded hatch assembly may render unnecessary a flow sensor and actuator motor, the spring loading automatically compensating for water flow rate as increased water flow pushes the lips or ribs 1123 of the spring-loaded batch.

Referring now to FIG. 12(A), (B) and (C), an alternative embodiment of a river turbine 1200 is shown where FIG. 12(A), (B), (C) are substantially identical to FIG. 11(A), (B) and (C). The differences lie in the gear box 1113 and relate to the further addition of input compensation. Per FIG. 12(B), center block 1201 is similarly shown with waterwheel shaft 1102 at its center. The block 1201 is attached to or integral with waterwheel shaft 1102. Control gear 1203 is meshed to worm gear 1204. Bottom output gear 1207 is attached to a bottom sun gear (not numbered). Increase gear 1208 is in the gear train from gear 1207 to ratio increase gear 1118. Increase gear 1209 is attached to gear 1208. This system may have two speed controls: a flow control and an input compensation control. Servo motor 1206 is provided for input compensation with worm 1205 in addition to servo motor 1116 and worm 1115. The control box may then send two signals through cables 1122 and 1211 to provide the flow and input compensation controls, for example, for the hatch movement.

Variable Torque Generator

Figure 13:
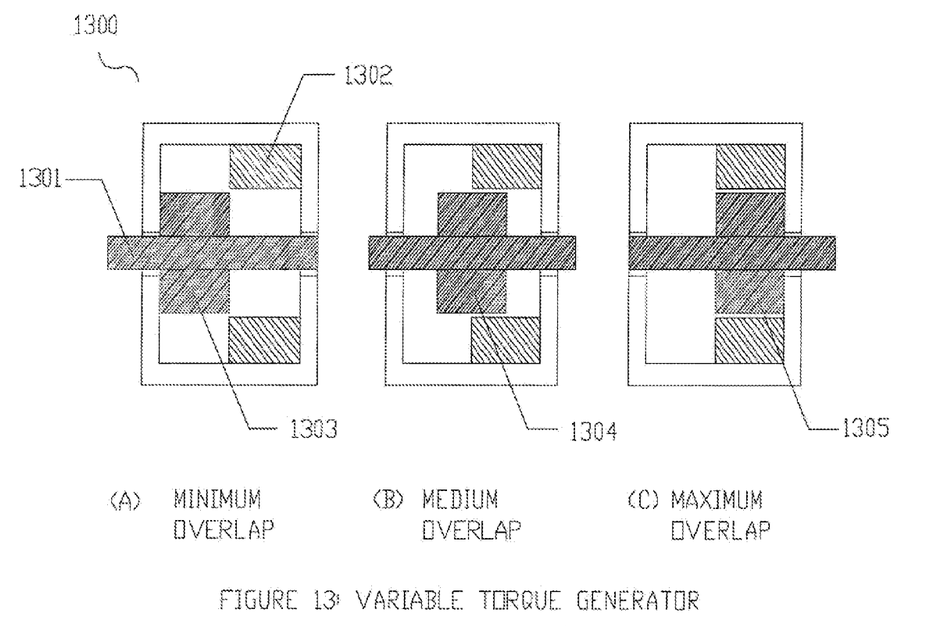

A variable torque generator useful in all embodiments for controlling torque from a maximum to a minimum is shown in FIG. 13(A), (B) and (C). For steady flowing streams, without much flow rate variation, a constant speed output can be easily produced by compensating the input. As shown in FIG. 13(A), (B) and (C), a constant speed, variable torque generator 1300, comprises rotor shaft 1301 on which may be displaced a moveable rotor 1303 to positions of minimum overlap with stator 1302 (FIG. 13(A)) to medium overlap 1304 (FIG. 13(B)) and maximum overlap 1305 (FIG. 13(C)). Moveable rotor 1303, 1304, 1305 may be connected to a variable transformer or other device or turbine discussed above. Note that in an alternative embodiment a stator may be moveable with respect to the rotor if needed to achieve minimum, medium and maximum torque. These variable torque generators may be added to an input compensating IVMC with a speed converter to output electric power to a grid.

Direction Control

Figure 14:
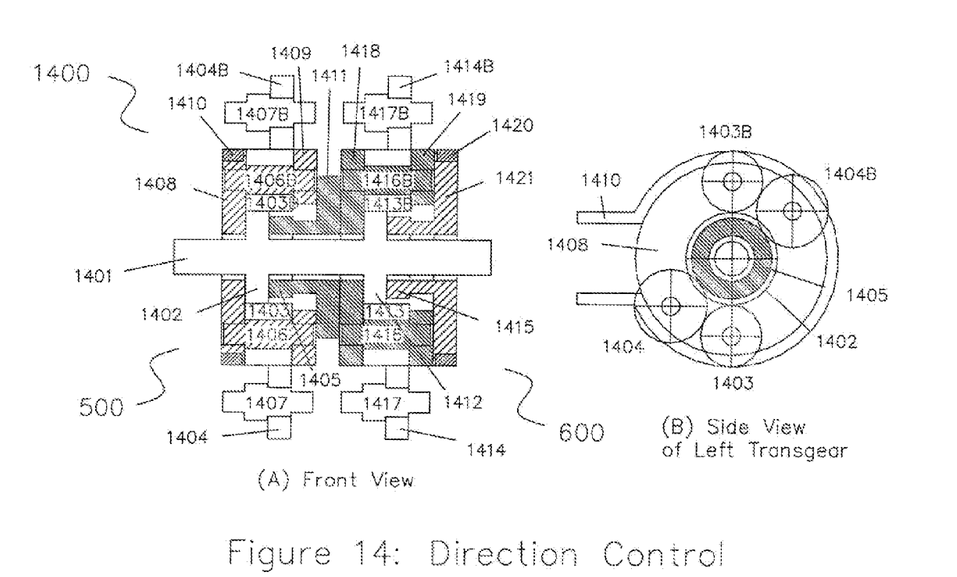

By assembling two transgear assemblies with a common input shaft as may be seen in FIGS. 14A and 14B, the direction change from forward to reverse can be made smoothly without grinding gears. In this case, the transgear assemblies are used as three variable clutches within direction control 1400.

Referring to FIGS. 14A and 14B, two spur gear transgear assemblies 500 (FIG. 5) and 600 (FIG. 6) (where FIG.'s 5 and 6 are found in U.S. patent application Ser. No. 13/425,501 of the same inventor filed Mar. 21, 2012, (now U.S. Pat. No. 8,641,570 issued Feb. 4, 2014), are assembled back to back along input shaft 1401 having first left sun gear 1402 and second left sun gear 1412. The first left sun gear 1402 of transgear assembly 500 is attached to or integral with the input shaft 1401. The second left sun gear 1412 of transgear assembly 600 is attached to or integral with input shaft 1401. Carrier brackets 1408 and 1409 are attached together by pins 1406 and 1407 in transgear assembly 500. The term "carrier bracket" as used in this specification is intended to be a general descriptor which includes, for example, "carrier," "carrier bracket" and "carrier gear," Planetary gears 1403 and 1404 may rotate freely around their corresponding pins and meshing first left sun gear 1402 and first right sun gear 1405 of the first transgear assembly 500. By convention, a "B" is used after a reference number to indicate a supplemental planetary gear such as 1403B may be supplemental to planetary gear 1403. A brake band 1410 may be positioned around carrier bracket 1408. First right sun gear 1405 is the output which is attached to output gear 1411.

Similarly, the second left sun gear 1412 of second (control) transgear assembly 600 is attached to or integral with the input shaft 1401. Second right sun gear 1415 is the control, and carrier brackets 1418 and 1419 are the output which is attached to the same output gear 1411, and a further brake band 1420 may be positioned around carrier bracket 1421, which is integral to an unlabeled sleeve and the second right sun gear 44051415 of the second spur gear transgear assembly 600.

When the input shaft 1401 is rotating clockwise (CW) and the brake band 1410 is activated or engaged, the carrier brackets 1408 and 1409 of the first transgear assembly 500 will be fixed by the brake, and the first right sun gear 1405, output gear 1411 or output will be rotating CCW (the opposite direction) from the input. When the brake band 1420 is activated of transgear assembly 600, the carrier brackets 1418 and 1419 will be rotating CW; the second right sun gear 1415 will be fixed, and output gear 1411 will be rotating CW, which, is the same direction as the input. Thus, there is forward and reverse direction control actuated via brake bands 1410, 1420, When both brake bands are free or not activated, there will be no output, neutral (free-wheeling), or no forward or reverse direction.

While various aspects of the present invention have been described above, it should be understood that they have been presented by way of example and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What I claim is:

1. An infinitely variable, forward and reverse, direction control assembly for use with a speed converter, the infinitely variable direction control assembly comprising
    an input shaft having first and second left sun gears attached to or integral with the input shaft, the second left sun gear being dispersed longitudinally along the input shaft to have a predetermined distance from the first left sun gear,
    first and second right sun gears, the first right sun gear being of a first spur gear transgear assembly and being attached to or integral with a first sleeve surrounding the input shaft, the first sleeve in turn being attached to or integral with an output gear, the second right sun gear being of a second spur gear transgear assembly and being located adjacent to the second left sun gear of the input shaft,
    the first left sun gear being associated with a first brake and a first carrier bracket, the first right sun gear being coupled to the output gear such that the first right sun gear and output gear have the opposite rotational direction as the input shaft, responsive to the first brake being actuated, and
    the second right sun gear being associated with a second brake and a second carrier bracket, the second right sun gear being fixed, third and fourth carrier brackets and the output gear having the same rotational direction as the input shaft, responsive to the second brake being actuated.

2. The direction control assembly of claim 1, the first brake actuating a brake disc coupled to the output gear, the first and second left sun gears comprising gears of a first and second spur gear transgear assembly respectively.

3. The direction control assembly of claim 1, the first spur gear transgear assembly further comprising the first carrier bracket and the first brake, the first carrier bracket being actuated by the first brake of the first spur gear transgear assembly, and the second spur gear transgear assembly further comprising the second carrier bracket, the second carrier bracket being actuated by the second brake of the second spur gear transgear assembly.

4. The direction control assembly of claim 1, the first spur gear transgear assembly further comprising the first carrier bracket, the second spur gear transgear assembly further comprising the second carrier bracket, the second carrier bracket being attached to or integral with the second right sun gear and a second sleeve surrounding the input shaft.

5. The direction control assembly of claim 2, the first spur gear transgear assembly comprising a fifth carrier bracket and the second spur gear assembly comprising the third carrier bracket, the fifth and third carrier brackets being meshed to the output gear at longitudinally spaced locations.

6. The direction control assembly of claim 5, the output gear having an opposite rotational direction as the input shaft when the first brake for actuating the opposite rotational direction as the input shaft is applied to the first spur gear transgear assembly, the output gear having a same rotational direction when the second brake for actuating the same rotational direction as the input shaft is applied to the second spur gear transgear assembly, and the output gear having a neutral or free-wheeling direction when neither the first brake nor the second brake are applied.

7. The direction control assembly of claim 1, the output gear having an opposite rotational direction as the input gear when the first brake for actuating the opposite rotational direction is applied to the first spur gear transgear assembly, the output gear having a same rotational direction when the second brake for actuating the same rotational direction is applied to the second spur gear transgear assembly, and the output gear having a neutral or free-wheeling direction when neither the first brake nor the second brake are applied.

8. The direction control assembly of claim 5 comprising first and second direction control assemblies, the input shaft being connected to a common output shaft of a speed converter on each of two sides of the common output shaft of the speed converter to comprise the first and second direction control assemblies, the first direction control assembly connected to a first side and the second direction control assembly connected to a second opposite side of the common output shaft of the speed converter, each of the first and second direction control assemblies having an associated output shaft and first and second brakes of the first and second direction control assemblies such that when the first brake of the first direction control assembly is actuated and the second brake of the second direction control assembly is actuated, the first and second associated output shafts cooperate to obtain a zero turning radius in one direction and when the second brake of the first direction control assembly is actuated and the first brake of the second direction control assembly is actuated, the first and second output shafts cooperate to obtain a zero turning radius in the other direction, one output shaft being in a contrary rotational direction to the rotational direction of the other output shaft.

9. The direction control assembly of claim 1, the first left sun gear integral to or attached to the input shaft having associated first and second planetary gears meshed to the first left sun gear and the first right sun gear integral to or attached to a first sleeve surrounding the input shaft having third and fourth planetary gears meshed to the first left sun gear, the first, second, third and fourth planetary gears being components of the first spur gear transgear assembly.

10. The direction control assembly of claim 1, the second right sun gear being attached to or integral with a second sleeve surrounding the input shaft, the second right sun gear and second sleeve having the second carrier bracket attached to or integral with the second sleeve, the second right sun gear, the second sleeve and second carrier bracket being components of the second spur gear transgear assembly.

11. The direction control assembly of claim 9, the first right sun gear being attached to or integral with a first sleeve surrounding the input shaft, the first right sun gear having associated fifth and sixth planetary gears meshed to the first left sun gear, the fifth and sixth planetary gears being components of the first spur gear transgear assembly.

12. The direction control assembly of claim 3, the second spur gear transgear assembly comprising a second sleeve surrounding the input shaft, the second sleeve being attached to or integral with the second carrier bracket, the second carrier bracket being actuated by the second brake of the second spur gear transgear assembly.

13. The direction control assembly of claim 3, the first spur gear transgear assembly further comprising a fifth carrier bracket, the first and fifth carrier brackets being attached together by a first pin.

14. The direction control assembly of claim 13, the first and fifth carrier brackets being attached together by the first pin and a second pin.

15. The direction control assembly of claim 1, the second spur gear transgear assembly further comprising the third and fourth carrier brackets, the third and fourth carrier brackets being attached together by a pin.

* * * * *